US011182445B2

United States Patent
Li et al.

(10) Patent No.: US 11,182,445 B2
(45) Date of Patent: Nov. 23, 2021

(54) METHOD, APPARATUS, SERVER, AND STORAGE MEDIUM FOR RECALLING FOR SEARCH

(71) Applicant: BEIJING BAIDU NETCOM SCIENCE AND TECHNOLOGY CO., LTD., Beijing (CN)

(72) Inventors: Chen Li, Beijing (CN); Di Jiang, Beijing (CN); Xinyu Wang, Beijing (CN); Yibin Wei, Beijing (CN); Pu Wang, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 644 days.

(21) Appl. No.: 16/054,365

(22) Filed: Aug. 3, 2018

(65) Prior Publication Data

US 2019/0057159 A1 Feb. 21, 2019

(30) Foreign Application Priority Data

Aug. 15, 2017 (CN) .......................... 201710697601.6

(51) Int. Cl.
G06F 16/95 (2019.01)
G06F 16/9535 (2019.01)
(Continued)

(52) U.S. Cl.
CPC ...... *G06F 16/9535* (2019.01); *G06F 16/2425* (2019.01); *G06F 16/24522* (2019.01); *G06F 16/3325* (2019.01); *G06N 3/08* (2013.01)

(58) Field of Classification Search
CPC ............. G06F 16/3344; G06F 16/3347; G06F 16/3325; G06F 16/9535; G06F 16/2425; G06F 16/24544; G06N 3/08
See application file for complete search history.

(56) References Cited

U.S. PATENT DOCUMENTS

2004/0243622 A1* 12/2004 Morisawa ............. G06F 16/353
2014/0149429 A1*  5/2014 Gao ....................... G06F 16/337
                                                                    707/749
(Continued)

FOREIGN PATENT DOCUMENTS

CN          106095983 A      11/2016
CN          106294584 A       1/2017
(Continued)

OTHER PUBLICATIONS

Shen, Yelong et al. "Learning Semantic Representations Using Convolutional Neural Networks for Web Search" WWW'14 Companion, Apr. 7-11, 2014, Seoul, Korea. ACM 978-1-4503-2745-9/14/04. http://dx.doi.org/10.1145/2567948.2577348 (Year: 2014).*

*Primary Examiner* — Alicia M Willoughby
(74) *Attorney, Agent, or Firm* — Lathrop GPM LLP (57) ABSTRACT

Embodiments of the present disclosure disclose a method, an apparatus, a server, and a storage medium for recalling for a search. The method for recalling for a search includes: acquiring a search term inputted by a user; calculating a semantic vector of the search term using a pre-trained neural network model; and recalling, according to a pre-established index, target documents related to the semantic vector of the search term from candidate documents, the index being established based on the semantic vectors of the candidate documents, and the semantic vectors of the candidate documents being calculated using the pre-trained neural network model. The embodiments of the present disclosure may solve a problem in the existing method for recalling that the recalling accuracy is affected by failing to generalize semantics, to improve the accuracy of recalling for a search.

9 Claims, 4 Drawing Sheets

(51) Int. Cl.
  *G06N 3/08* (2006.01)
  *G06F 16/242* (2019.01)
  *G06F 16/2452* (2019.01)
  *G06F 16/332* (2019.01)

(56) References Cited

U.S. PATENT DOCUMENTS

| | | | |
|---|---|---|---|
| 2014/0280312 A1* | 9/2014 | Blumenfeld | G06F 16/951 707/769 |
| 2015/0332169 A1* | 11/2015 | Bivens | G06N 20/00 706/12 |
| 2017/0061286 A1* | 3/2017 | Kumar | G06Q 30/0269 |
| 2017/0154245 A1 | 6/2017 | Osindero | |
| 2017/0372398 A1* | 12/2017 | Kopru | G06Q 30/0627 |
| 2018/0052908 A1* | 2/2018 | Liu | G06F 16/316 |
| 2018/0052928 A1* | 2/2018 | Liu | G06F 16/2228 |
| 2018/0365589 A1* | 12/2018 | Lacoste | G16H 50/70 |
| 2019/0005547 A1* | 1/2019 | Tan | G06F 16/435 |
| 2019/0057159 A1* | 2/2019 | Li | G06F 16/9535 |
| 2020/0175023 A1* | 6/2020 | Zhang | G06F 16/24578 |

FOREIGN PATENT DOCUMENTS

| | | | | |
|---|---|---|---|---|
| CN | 106407311 A | | 2/2017 | |
| CN | 106547871 A | | 3/2017 | |
| CN | 106815252 B | * | 8/2020 | G06F 16/332 |

\* cited by examiner

METHOD, APPARATUS, SERVER, AND STORAGE MEDIUM FOR RECALLING FOR SEARCH

CROSS-REFERENCE TO RELATED APPLICATIONS

This application claims priority to Chinese Patent Application no. 201710697601.6, filed with the State Intellectual Property Office of the People's Republic of China (SIPO) on Aug. 15, 2017, the content of which is incorporated herein by reference in its entirety.

TECHNICAL FIELD

Embodiments of the present disclosure relate to the Internet technology, and specifically to a method, an apparatus, a server, and a storage medium for recalling for a search.

BACKGROUND

As the Internet technology develops rapidly, functions of a search engine are increasingly powerful. According to the purposes and performances, a search is generally divided into two parts: recalling and sorting. The purpose of recalling is to screen a small number of related results from a large number of candidate webpages/documents based on a search term inputted by a user. The purpose of sorting is to optimize the recalled results, and calculate a correlation between the results and the search term using more detailed characteristics. Based on this, the order of the sorted results is the order finally displayed to the user.

In general, in the search engine, the recalling is implemented using a word/phrase granularity based matching method such as an inverted index, and the related results are obtained through an inverted zipper of the word/phrase. The results are evaluated using indicators such as TFIDF (term frequency-inverse document frequency, a common weighting technique for searching information and mining data) and BM25 (a common formula for scoring a correlation). However, since the indicators such as TFIDF and BM25 are based on a literal match and fail to generalize semantics, the recalling accuracy is affected.

SUMMARY

Embodiments of the present disclosure provide a method, an apparatus, a server, and a storage medium for recalling for a search, to solve the problem in the existing recalling method that the recalling accuracy is affected by failing to generalize the semantics.

In a first aspect, the embodiments of the present disclosure provide a method for recalling for a search. The method includes:

acquiring a search term inputted by a user;

calculating a semantic vector of the search term using a pre-trained neural network model; and recalling, according to a pre-established index, target documents related to the semantic vector of the search term from candidate documents, the index being established based on the semantic vectors of the candidate documents, and the semantic vectors of the candidate documents being calculated using the pre-trained neural network model.

In a second aspect, the embodiments of the present disclosure further provide an apparatus for recalling for a search. The apparatus includes:

a search term acquisition module, configured to acquire a search term inputted by a user;

a semantic vector calculation module, configured to calculate a semantic vector of the search term using a pre-trained neural network model; and a document recalling module, configured to recall, according to a pre-established index, target documents related to the semantic vector of the search term from candidate documents, the index being established based on the semantic vectors of the candidate documents, and the semantic vectors of the candidate documents being calculated using the pre-trained neural network model.

In a third aspect, the embodiments of the present disclosure further provide a server. The server includes:

one or more processors; and a storage device, configured to store one or more programs, wherein the one or more programs, when executed by the one or more processors, cause the one or more processors to implement the method described above.

In a fourth aspect, the embodiments of the present disclosure further provide a computer readable storage medium storing a computer program. The program, when executed by a processor, implements the method described above.

In the embodiments of the present disclosure, the semantic vector of the search term is calculated using the pre-trained neural network model. According to the pre-established index, the target documents related to the semantic vector of the search term are recalled from the candidate documents, so that a high-quality semantic characteristic trained by big data is used in the recall task, which solves the problem in the existing recalling method that the recalling accuracy is affected by failing to generalize the semantics, thereby achieving the effect of improving the recalling accuracy.

DETAILED DESCRIPTION OF EMBODIMENTS

The present disclosure will be further described below in detail in combination with the accompanying drawings and the embodiments. It should be appreciated that the specific embodiments described herein are merely used for explaining the present disclosure, rather than limiting the present disclosure. In addition, it should be noted that, for the ease of description, only the parts related to the present disclosure are shown in the accompanying drawings.

The First Embodiment

Figure 1:
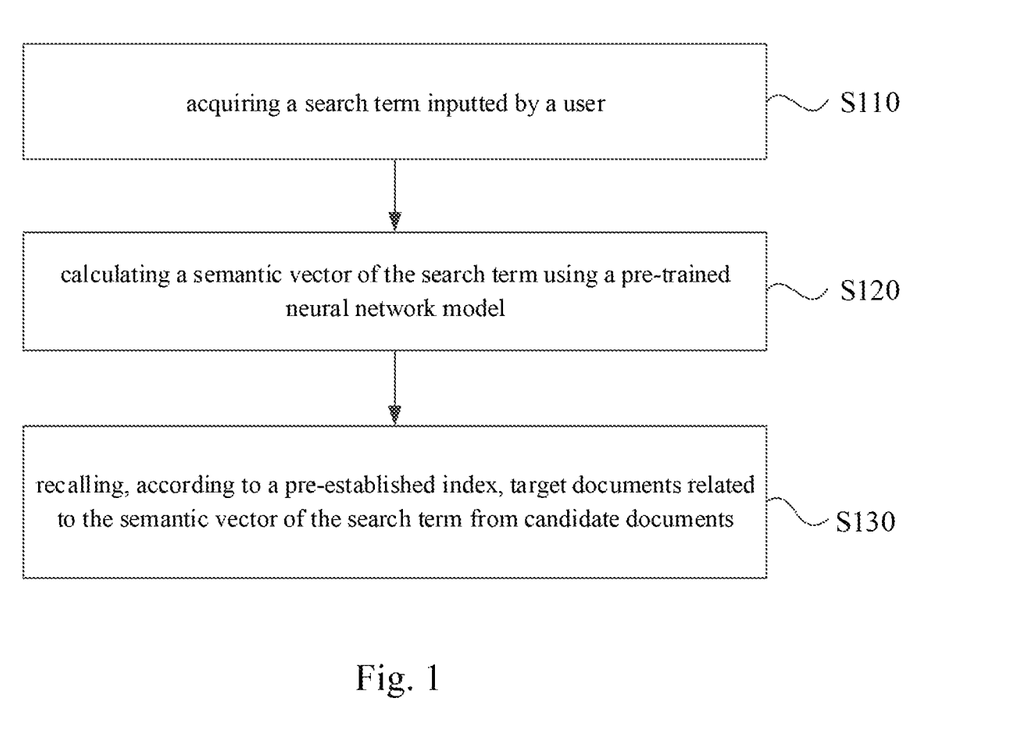
FIG. 1 is a flowchart of a method for recalling for a search according to the first embodiment of the present disclosure.

FIG. 1 is a flowchart of a method for recalling for a search according to the first embodiment of the present disclosure.

This embodiment may be suitable for the situation where a search is recalled. This method may be performed by an apparatus for recalling for a search. The apparatus may be implemented by means of software and/or hardware. As shown in FIG. 1, the method includes the following steps.

S110, acquiring a search term inputted by a user.

The search term is the key content inputted in a search engine by the user according to a search purpose of the user. Specifically, the search term may be a word, a phrase, or a sentence. The search term may be a Chinese character, an English word, a letter, one or more numbers, or the search content formed by combining the foregoing forms.

S120, calculating a semantic vector of the search term using a pre-trained neural network model.

It should be noted that, the search engine in the existing technology generally obtains related results using an inverted zipper of a word/phrase in the search term, and evaluates the results using indicators such as TFIDF and BM25. Accordingly, the recalled search results are merely based on a literal match, which has certain limitations and is not comprehensive.

For example, if a keyword inputted in the search engine by the user is "appearance," the search results are contents containing the word. If the search term is replaced with the word "face," since the two words are a pair of synonyms, the search results of the two searches may contain target information that the user wants to acquire. Therefore, the semantic vector of the search term should first be calculated. The search result is recalled based on the semantic vector, which may make the recalled search results more comprehensive and accurate. The semantic vector is expressed by a vector of document semantics calculated by the pre-trained neural network model, which may be used to depict a similarity between words and a similarity between a word and a text. The calculation method for the semantic vector may be, for example, a basic operation of a word vector (i.e., addition and multiplication), a RNN algorithm, and a CNN algorithm, which will not be repeatedly described here.

Specifically, the neural network model is generated and trained by using data mined from a user log accumulated by the search engine as a training sample. The user log records all items displayed to users, and the items include the items clicked by the users and the items not clicked by the users. A conventional item includes, for example, three fields: search term-document/webpage information (including a title)-whether the item is clicked, and the item information is saved in the user log.

S130, recalling, according to a pre-established index, target documents related to the semantic vector of the search term from candidate documents.

The index is established based on the semantic vectors of the candidate documents, and the semantic vectors of the candidate documents are calculated using the pre-trained neural network model. The index is used to represent a relationship between the semantic vector and the candidate documents. The candidate documents refer to all documents or webpage that may be obtained, for example, a large number of documents crawled by a web crawler.

Further, the recalling, according to a pre-established index, target documents related to the semantic vector of the search term from candidate documents includes:

calculating similarities between the semantic vector of the search term and the semantic vectors of the candidate documents in the index; and recalling, according to the index, the candidate documents corresponding to the semantic vectors having the similarities satisfying a preset condition as the target documents.

For example, a conventional method of calculating a text similarity is the cosine similarity calculation method. Here, the semantic vector of the search term and the semantic vectors of the candidate documents have been calculated through the pre-trained neural network model. By calculating the cosine value of an angle between the two vectors to evaluate the similarity between the two vectors, it may further be determined whether the two vectors are similar on the basis of whether the similarity satisfies the preset condition. The preset condition is a preset similarity threshold. When the similarity satisfies the threshold, the candidate document corresponding to the semantic vector having the similarity satisfying the preset condition is recalled as the target document. In addition, recalled target documents may be displayed in order on the basis of the degree of the similarity, thereby omitting a sorting task and saving resources.

In the technical solution of this embodiment, the semantic vector of the search term is calculated using the pre-trained neural network model. According to the pre-established index, the target documents related to the semantic vector of the search term are recalled from the candidate documents, which solves the problem in the existing recalling method that the recalling accuracy is affected by failing to generalize the semantics, thereby achieving the effect of improving the recalling accuracy.

The Second Embodiment

Figure 2:
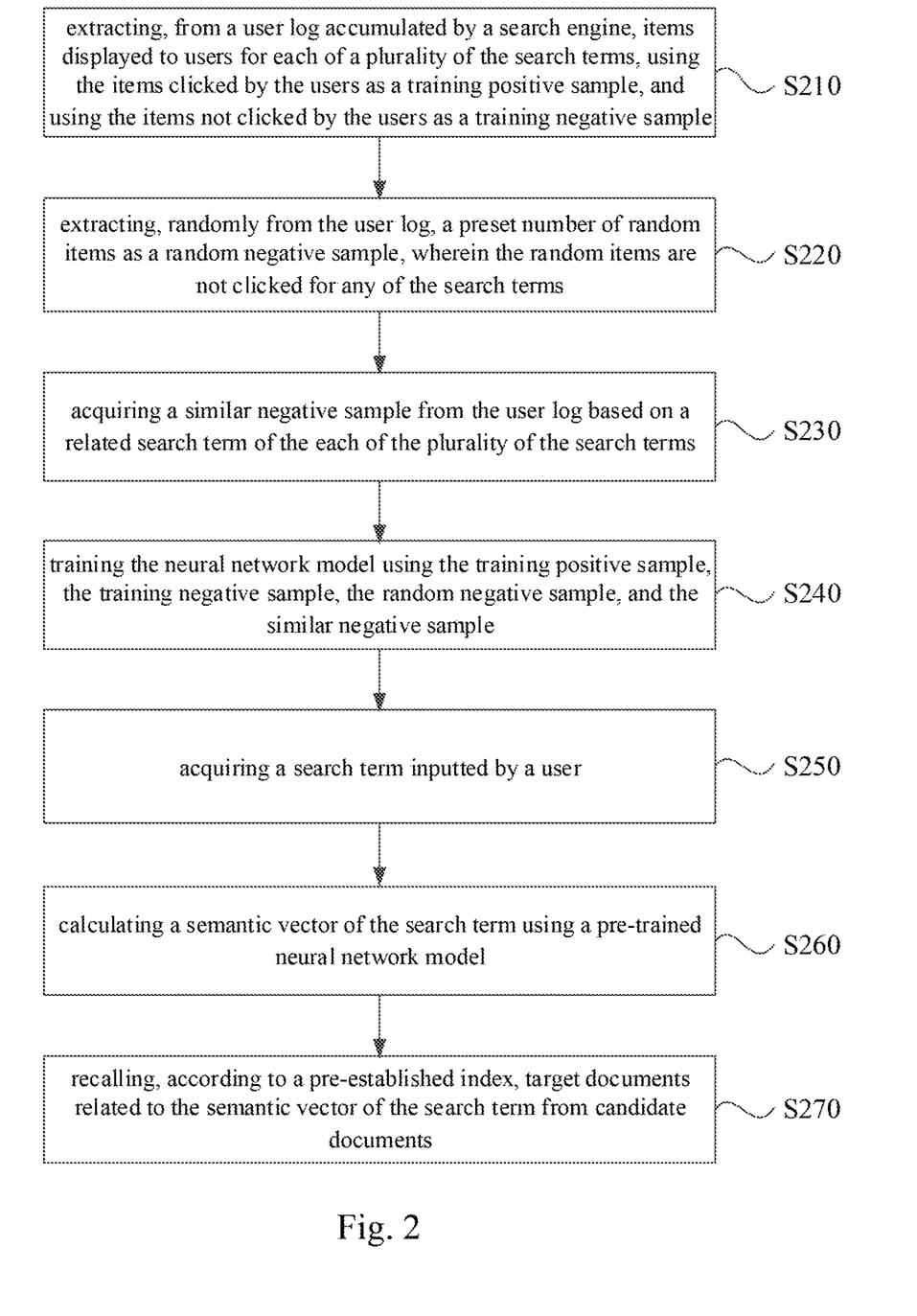
FIG. 2 is a flowchart of a method for recalling for a search according to the second embodiment of the present disclosure.

FIG. 2 is a flowchart of a method for recalling for a search according to the second embodiment of the present disclosure. On the basis of the first embodiment, the second embodiment further optimizes the process of training the neural network model. As shown in FIG. 2, the method includes the following steps.

S210, extracting, from a user log accumulated by a search engine, items displayed to users for each of a plurality of the search terms, using the items clicked by the users as a training positive sample, and using the items not clicked by the users as a training negative sample.

S220, extracting, randomly from the user log, a preset number of random items as a random negative sample, wherein the random items are not clicked for any of the search terms.

The random negative sample refers to the items not clicked for any of the search terms. As a supplementary negative sample, the random negative sample is used to improve accuracy of screening irrelevant results, and reduce incorrect trainings on a high-quality website/item. The preset number may be configured according to actual needs. It should be noted that if the random item in the random negative sample is identical to an item in the training negative sample of the each of the plurality of the search terms, the random negative sample and the training negative sample are de-duplicated and combined.

S230, acquiring a similar negative sample from the user log based on a related search term of the each of the plurality of the search terms.

Figure 3:
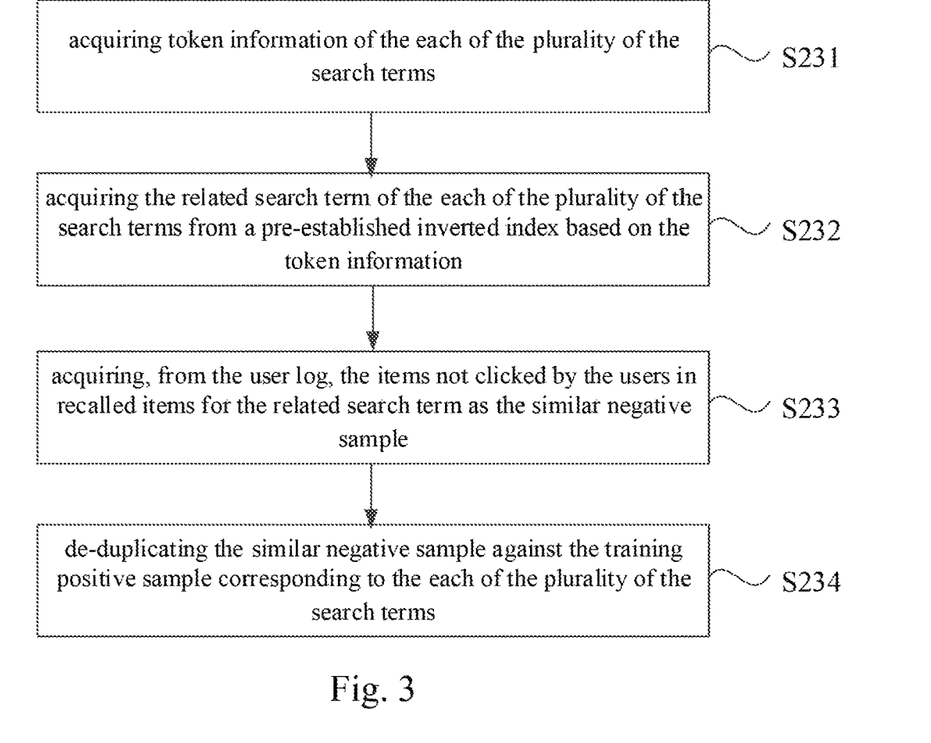
FIG. 3 is a flowchart of acquiring a similar negative sample in the method for recalling for a search according to the second embodiment of the present disclosure.

The related search term refers to a search term that has a correlation with the original search term. Specifically, as shown in FIG. 3, the acquiring a similar negative sample in S230 may include the following steps.

S231, acquiring token information of the each of the plurality of the search terms.

When obtaining the related search term of the search term, tokenization needs to first be performed on the search term. The tokenization includes decomposing the search term to obtain a character, a word, or a phrase of the search term as the result of the tokenization. For example, assuming that the search term inputted in the search engine by the user is "ways of using the mobile phone," the search term may be tokenized into tokens "ways," "of," "using," and "the mobile phone."

S232, acquiring the related search term of the each of the plurality of the search terms from a pre-established inverted index based on the token information.

The inverted index is an index with which a record needs to be found based on an attribute value in the practical application. Each item in this kind of index table includes one attribute value and an address of each record possessing the attribute value. The inverted index in the traditional recall task is an index between a term and a document. However, the inverted index in the embodiments of the present disclosure is an index between a term and a related term. That is, based on the token information, related search terms corresponding to each token may sequentially be found in the inverted index. The inverted index may be established using any method in the existing technology, which will not be repeatedly described here.

S233, acquiring, from the user log, the items not clicked by the users in recalled items for the related search term as the similar negative sample.

It should be noted that in the neural network training method for a sort task in the existing technology, since the positive and negative samples inputted during the training are generally mined from a click log of the users, and these positive and negative samples are generated from the recalled results, there is no unrecalled results during the training, resulting in low accuracy of the model in the prediction of unrecalled results, which cannot meet the requirements of the recall task. Therefore, in the embodiments of the present disclosure, based on the positive and negative samples, the random negative sample and the similar negative sample are generated as the supplementary negative samples to improve the accuracy of screening the irrelevant results.

Preferably, after the similar negative sample is obtained, S230 may further include S234.

S234, de-duplicating the similar negative sample against the training positive sample corresponding to the each of the plurality of the search terms.

Specifically, since it is possible that the item in the acquired similar negative sample and that in the corresponding training positive sample of the each of the search terms are identical, the accuracy of training the model may be improved after the de-duplication. For example, assuming that the user searches for "apple" in the search engine, the search result may be related to a delicious apple or an Apple mobile phone. Regardless of whether the user clicks or not, or in a situation where the user just clicks on a search result, the Apple mobile phone or the delicious apple may be likely to appear in the search results of the related search term of the term "apple." In such case, the duplication will occur. Moreover, it should further be considered that whether the user clicks a searched non-target result in the search results. The non-target result may be a result recalled based on the related search term of the original search term.

S240, training the neural network model using the training positive sample, the training negative sample, the random negative sample, and the similar negative sample. The algorithm used for training the model is not limited in the embodiments of the present disclosure.

S250, acquiring a search term inputted by a user.

S260, calculating a semantic vector of the search term using a pre-trained neural network model.

S270, recalling, according to a pre-established index, target documents related to the semantic vector of the search term from candidate documents, the index being established based on the semantic vectors of the candidate documents, and the semantic vectors of the candidate documents being calculated using the pre-trained neural network model.

In the embodiments of the present disclosure, by using the items extracted from the user log and clicked by the users as the positive sample, the items extracted from the user log and not clicked by the users as the negative sample, and using the generated random negative sample and the similar negative sample as the supplementary training negative samples of the neural network model, accuracy of screening irrelevant results may be improved, and then the accuracy of the trained neural network model may be enhanced. Meanwhile, the inverted index applied in the recall stage is used as the way to generate the similar negative sample to be applied in the training of the neural network, so that a semantic model based on the neural network can satisfy recall requirements.

The Third Embodiment

Figure 4:
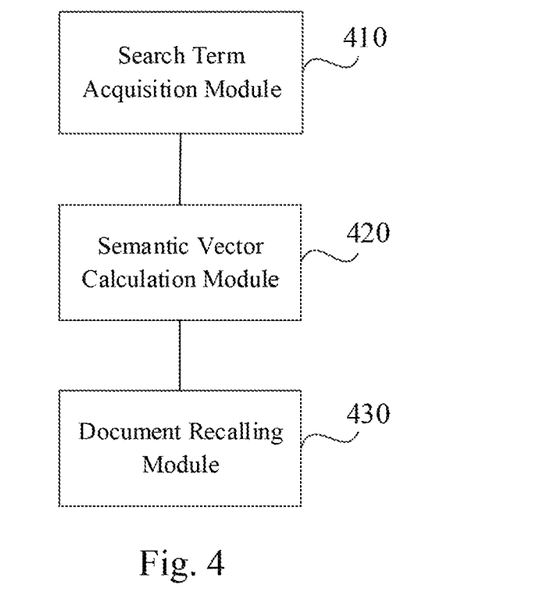
FIG. 4 is a schematic structural diagram of an apparatus for recalling for a search according to the third embodiment of the present disclosure.

FIG. 4 is a schematic structural diagram of an apparatus for recalling for a search according to the third embodiment of the present disclosure. As shown in FIG. 4, the apparatus for recalling for a search includes:

a search term acquisition module 410, configured to acquire a search term inputted by a user;

a semantic vector calculation module 420, configured to calculate a semantic vector of the search term using a pre-trained neural network model; and a document recalling module 430, configured to recall, according to a pre-established index, target documents related to the semantic vector of the search term from candidate documents, the index being established based on the semantic vectors of the candidate documents, and the semantic vectors of the candidate documents being calculated using the pre-trained neural network model.

Preferably, the apparatus for recalling for a search further includes: a model training module configured to train the neural network model. Further, the model training module includes:

a first sample extraction unit, configured to extract, from a user log accumulated by a search engine, items displayed to users for each of a plurality of the search terms, use the items clicked by the users as a training positive sample, and use the items not clicked by the users as a training negative sample;

a second sample extraction unit, configured to extract, randomly from the user log, a preset number of random items as a random negative sample, wherein the random items are not clicked for any of the search terms;

a third sample extraction unit, configured to acquire a similar negative sample from the user log based on a related search term of the each of the plurality of the search terms; and a model training unit, configured to train the neural network model using the training positive sample, the training negative sample, the random negative sample, and the similar negative sample.

Further, the third sample extraction unit includes:

a tokenizer subunit, configured to acquire token information of the each of the plurality of the search terms;

a related search term acquisition subunit, configured to acquire the related search term of the each of the plurality of the search terms from a pre-established inverted index based on the token information, wherein the inverted index is the inverted index of the token information and a candidate search term pre-established using the each of the plurality of the search terms and the token information of the each of the plurality of the search terms in the user log; and a similar negative sample acquisition subunit, configured to acquire, from the user log, the items not clicked by the users in recalled items for the related search term as the similar negative sample.

Preferably, the third sample extraction unit further includes:

a de-duplicating subunit, configured to de-duplicate the similar negative sample against the training positive sample corresponding to the each of the plurality of the search terms.

Further, the document recalling module includes:

a calculation unit, configured to calculate similarities between the semantic vector of the search term and the semantic vectors of the candidate documents in the index; and a recalling unit, configured to recall, according to the index, the candidate documents corresponding to the semantic vectors having the similarities satisfying a preset condition as the target documents.

The apparatus for recalling for a search provided by the embodiments of the present disclosure may perform the method for recalling for a search provided by any embodiment of the present disclosure, and possess functional modules for performing the method and corresponding beneficial effects.

The Fourth Embodiment

Figure 5:
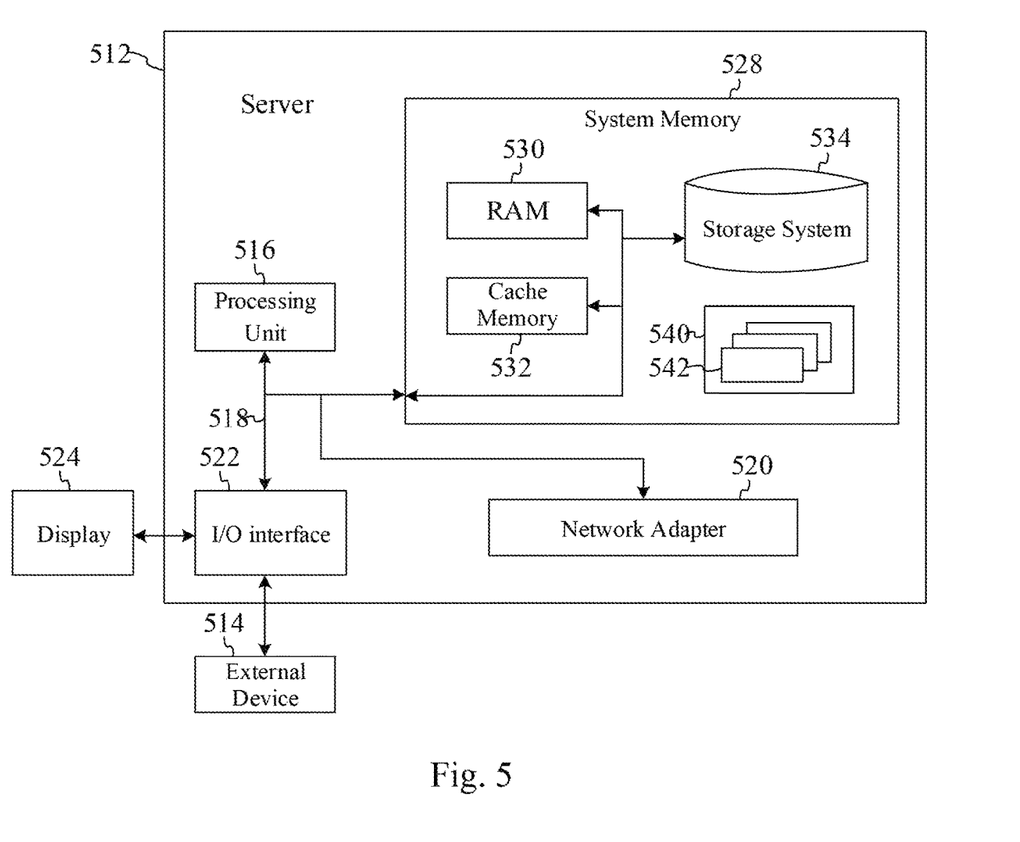
FIG. 5 is a schematic structural diagram of a server according to the fourth embodiment of the present disclosure.

FIG. 5 is a schematic structural diagram of a server according to the fourth embodiment of the present disclosure. FIG. 5 is a block diagram of an exemplary server device 512 adapted to implement the embodiments of the present disclosure. The server 512 shown in FIG. 5 is merely an example, which should not bring any limitations to the functions and the scope of the embodiments of the present disclosure.

As shown in FIG. 5, the server 512 is represented by a universal computing device. Components of the server 512 may include, but not limited to, one or more processors or processing units 516, a system memory 528, and a bus 518 connecting different system components (including the system memory 528 and the processing unit 516).

The bus 518 represents one or more of several types of bus structures, including a memory bus or a memory controller, a peripheral bus, an accelerated graphics port, a processor buss, or a local bus used in any of a variety of bus architectures. For example, these architectures include, but not limited to, an industry standard architecture (ISA) bus, a microchannel architecture (MCA) bus, an enhanced ISA bus, a video electronics standard association (VESA) local bus and a peripheral component interconnection (PCI) bus.

The server 512 typically includes a variety of computer readable media. The computer readable media, which include volatile and non-volatile media, and removable and non-removable media, may be any available medium that can be accessed by the server 512.

The system memory 528 may include a computer system readable medium in the form of volatile memory, for example, a random access memory (RAM) 530 and/or a cache memory 532. The server 512 may further include other removable and non-removable computer system readable media and volatile and non-volatile computer system readable media. Only as an example, the storage system 534 may be used to read and write non-removable and non-volatile magnetic media (not shown in FIG. 5, generally referred to as "hard disk drive"). A magnetic disk driver that reads from or writes to a removable and non-volatile magnetic disk (i.e., a soft disk) and an optical disk driver that reads from or writes to a removable and non-volatile optical disk (i.e., a CD-ROM, a DVD-ROM or other optical media) may also be provided, even though they are not shown in FIG. 5. In such cases, each driver may be coupled to the bus 518 through one or more data medium interfaces. The memory 528 may include at least one program product, which has a set of (for example, at least one) program modules configured to perform the functions of the various embodiments of the present disclosure.

A program/utility tool 540 having a set of (at least one) program modules 542 may be stored, for example, in the memory 528. The program modules 542 include, but are not limited to, an operating system, one or more applications, other program modules, and program data, and each or a certain combination of these examples may include the implementation of the network environment. The program modules 542 usually perform the functions and/or method in the embodiments described in the present disclosure.

The server 512 may communicate with one or more external devices 514 (i.e., a keyboard, a pointing device, a display 524), and may also communicate with one or more devices that enable the user to interact with the computer device 512, and/or communicate with any device (i.e., a network card, and a modulator-demodulator) that enables the server 512 to communicate with one or more other computing devices. This communication may be performed through an input/output (I/O) interface 522. Moreover, the computer device 512 may also communicate with one or more networks (i.e., a local area network (LAN), a wide area network (WAN) and/or a public network such as the Internet) through a network adapter 520. As shown in FIG. 5, the network adapter 520 communicates with other modules of the computer device 512 via the bus 518. It should be understood that, other hardware and/or software modules that may be used in combination with the computer device 512 includes, but are not limited to, a microcode, a device driver, a redundant processing unit, an external disk drive array, a RAID system, a tape driver, and a data backup storage system.

The processing unit 516 executes a program stored in the system memory 528 to perform various functional applications and data processing, for example, to implement the method for recalling for a search provided by the embodiments of the present disclosure. The method includes:

acquiring a search term inputted by a user;

calculating a semantic vector of the search term using a pre-trained neural network model; and recalling, according to a pre-established index, target documents related to the semantic vector of the search term from candidate documents, the index being established based on the semantic vectors of the candidate documents, and the semantic vectors of the candidate documents being calculated using the pre-trained neural network model.

The Fifth Embodiment

The fifth embodiment of the present disclosure provides a computer readable storage medium storing a computer program. The program, when executed by a processor, implements the method for recalling for a search provided by the embodiments of the present disclosure. The method includes:

acquiring a search term inputted by a user;

calculating a semantic vector of the search term using a pre-trained neural network model; and recalling, according to a pre-established index, target documents related to the semantic vector of the search term from candidate documents, the index being established based on the semantic vectors of the candidate documents, and the semantic vectors of the candidate documents being calculated using the pre-trained neural network model.

The computer storage medium of the embodiments of the present disclosure may use any combination of one or more computer readable media. The computer readable medium may be a computer readable signal medium or a computer readable storage medium. For example, the computer readable storage medium may be, but not limited to, an electric, magnetic, optical, electromagnetic, infrared or semiconductor system, apparatus or device, or any combination of the above. More specific examples (a non-exhaustive list) of the computer readable storage media include: electric connections having one or more wires, a portable computer magnetic disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above. In the present disclosure, the computer readable storage medium may be any tangible medium containing or storing a program, which may be used by or in combination with an instruction execution system, apparatus, or device.

The computer readable signal medium may include a data signal that is propagated in a baseband or as a part of a carrier wave, the data signal carrying a computer readable program code. Such propagated data signal may employ a variety of forms including, but not limited to, an electromagnetic signal, an optical signal, or any suitable combination of the above. The computer readable signal medium may also be any computer readable medium other than the computer readable storage medium. The computer readable medium may transmit, propagate, or transfer the program used by or in combination with the instruction execution system, apparatus, or device.

The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for recalling for a search, comprising:
acquiring a search term inputted by a user;
calculating a semantic vector of the search term using a pre-trained neural network model; and
recalling, according to a pre-established index, target documents related to the semantic vector of the search term from candidate documents, the index being established based on the semantic vectors of the candidate documents, and the semantic vectors of the candidate documents being calculated using the pre-trained neural network model, wherein the neural network model is trained by:
extracting, from a user log accumulated by a search engine, items displayed to users for each of a plurality of search terms, using the items clicked by the users as a training positive sample, and using the items not clicked by the users as a training negative sample;
extracting, randomly from the user log, a preset number of random items as a random negative sample, wherein the random items are not clicked for any of the search terms;
acquiring a related negative sample from the user log based on a related search term of the each of the plurality of the search terms, wherein the related negative sample is an item displayed to the users for the related search item and not clicked by the users; and
training the neural network model using the training positive sample, the training negative sample, the random negative sample, and the related negative sample.

2. The method according to claim 1, wherein the acquiring a related negative sample from the user log based on a related search term of the each of the plurality of the search terms comprises:
acquiring token information of the each of the plurality of the search terms;
acquiring the related search term of the each of the plurality of the search terms from a pre-established inverted index based on the token information, wherein the inverted index is the inverted index of the token information and a candidate search term pre-established using the each of the plurality of the search terms and the token information of the each of the plurality of the search terms in the user log; and
acquiring, from the user log, the items not clicked by the users in recalled items for the related search term as the related negative sample.

3. The method according to claim 2, wherein the acquiring a related negative sample from the user log based on a related search term of the each of the plurality of the search terms further comprises:
de-duplicating the related negative sample against the training positive sample corresponding to the each of the plurality of the search terms.

4. The method according to claim 1, wherein the recalling, according to a pre-established index, target documents related to the semantic vector of the search term from candidate documents comprises:
calculating similarities between the semantic vector of the search term and the semantic vectors of the candidate documents in the index; and
recalling, according to the index, the candidate documents corresponding to the semantic vectors having the similarities satisfying a preset condition as the target documents.

5. An apparatus for recalling for a search, comprising:
at least one processor; and
a memory storing instructions, the instructions when executed by the at least one processor, cause the at least one processor to perform operations, the operations comprising:
acquiring a search term inputted by a user; calculating a semantic vector of the search term using a pre-trained neural network model; and
recalling, according to a pre-established index, target documents related to the semantic vector of the search term from candidate documents, the index being established based on the semantic vectors of the candidate documents, and the semantic vectors of the candidate documents being calculated using the pre-trained neural network model, wherein the neural network model is trained by:
extracting, from a user log accumulated by a search engine, items displayed to users for each of a plurality of search terms, using the items clicked by the users as a training positive sample, and using the items not clicked by the users as a training negative sample;
extracting, randomly from the user log, a preset number of random items as a random negative sample, wherein the random items are not clicked for any of the search terms;
acquiring a related negative sample from the user log based on a related search term of the each of the plurality of the search terms, wherein the related negative sample is an item displayed to the users for the related search item and not clicked by the users; and
training the neural network model using the training positive sample, the training negative sample, the random negative sample, and the related negative sample.

6. The apparatus according to claim 5, wherein the third sample extraction unit comprises:
acquiring token information of the each of the plurality of the search terms;
acquiring the related search term of the each of the plurality of the search terms from a pre-established inverted index based on the token information, wherein the inverted index is the inverted index of the token information and a candidate search term pre-established using the each of the plurality of the search terms and the token information of the each of the plurality of the search terms in the user log; and
acquiring, from the user log, the items not clicked by the users in recalled items for the related search term as the related negative sample.

7. The apparatus according to claim 6, wherein the third sample extraction unit further comprises:
de-duplicating the related negative sample against the training positive sample corresponding to the each of the plurality of the search terms.

8. The apparatus according to claim 5, wherein the document recalling module comprises:
calculating similarities between the semantic vector of the search term and the semantic vectors of the candidate documents in the index; and
recalling, according to the index, the candidate documents corresponding to the semantic vectors having the similarities satisfying a preset condition as the target documents.

9. A non-transitory computer-readable storage medium storing a computer program, the computer program when executed by one or more processors, causes the one or more processors to perform operations, the operations comprising:
acquiring a search term inputted by a user;
calculating a semantic vector of the search term using a pre-trained neural network model; and
recalling, according to a pre-established index, target documents related to the semantic vector of the search term from candidate documents, the index being established based on the semantic vectors of the candidate documents, and the semantic vectors of the candidate documents being calculated using the pre-trained neural network model, wherein the neural network model is trained by:
extracting, from a user log accumulated by a search engine, items displayed to users for each of a plurality of search terms, using the items clicked by the users as a training positive sample, and using the items not clicked by the users as a training negative sample;
extracting, randomly from the user log, a preset number of random items as a random negative sample, wherein the random items are not clicked for any of the search terms;
acquiring a related negative sample from the user log based on a related search term of the each of the plurality of the search terms, wherein the related negative sample is an item displayed to the users for the related search item and not clicked by the users; and
training the neural network model using the training positive sample, the training negative sample, the random negative sample, and the related negative sample.

* * * * *